Nov. 1, 1955

T. O. SUMMERS, JR 2,722,126

GYROSCOPE ERECTING DEVICE

Filed Nov. 12, 1952

THOMAS O. SUMMERS, JR.
INVENTOR.

BY R. E. Geangue

ATTORNEY

Nov. 1, 1955 T. O. SUMMERS, JR 2,722,126
GYROSCOPE ERECTING DEVICE
Filed Nov. 12, 1952 3 Sheets-Sheet 2

THOMAS O. SUMMERS, JR.
INVENTOR.

BY R. E. Grangee
ATTORNEY

Nov. 1, 1955                T. O. SUMMERS, JR                2,722,126
                          GYROSCOPE ERECTING DEVICE
Filed Nov. 12, 1952                                      3 Sheets-Sheet 3

THOMAS O. SUMMERS, JR.
INVENTOR.

BY R. E. Beaugue
ATTORNEY

United States Patent Office 2,722,126
Patented Nov. 1, 1955

2,722,126

GYROSCOPE ERECTING DEVICE

Thomas O. Summers, Jr., Sherman Oaks, Calif.

Application November 12, 1952, Serial No. 320,089

4 Claims. (Cl. 74—5.45)

This invention relates to a device for erecting a control gyroscope for a movable craft and more particularly to an erecting device which is disengaged when acceleration forces other than gravity are encountered by the craft.

Heretofore, it has usually been the practice to employ one of two methods to detect turning of the aircraft for the purpose of disengaging the erecting mechanism. One method utilizes a turn sensitive rate gyro to operate an electrical circuit to electrically disengage the erector. The other and simpler method cuts out the erecting mechanism upon displacement between the gyro gimbal and its support by an amount greater than a predetermined angle. This latter method, however, has a disadvantage when the gyro is at rest in that a displacement might exist between the gimbal and its support causing disabling of the erecting device and the gyro would have to be caged or erected in some other way. Such previous methods are complicated and usually require electrical circuitry or complicated mechanism which invariably increases the cost and lessens the reliability of the instrument.

By the present invention, a simple method is provided for disengaging the erecting device during turns. This method lends itself especially to erecting mechanisms forming the subject matter of patent applications Serial Nos. 225,997 (now U. S. Patent No. 2,635,469) and 320,090, filed on May 12, 1951, and November 12, 1952, respectively, by Thomas O. Summers, Jr. In both of these erecting mechanisms, a spring loaded friction plunger is adjusted to exert a friction erecting force against a spherical erecting dome. To remove or reduce this erecting force, the friction erector of the present invention is weighted so as to pull away from the erecting dome whenever the resultant vector between the components of gravity and acceleration exceeds the pull of gravity, or, in other words, during turning of the craft.

It is therefore an object of this invention to provide an erecting mechanism which is disengaged by acceleration forces other than gravitational force.

Another object of the invention is the provision of an erecting mechanism which is normally held in erecting position against the force of gravity and which is removed from erecting position by accelerating forces developed during turning movement.

A still further object of the invention is to provide an erecting device which is effective to erect a gyro vertical about the roll axis of the mounting craft only during straight flight.

Another object is to provide an erector which is normally held in erecting position against gravitation force by a spring which is overcome when acceleration forces are encountered in addition to gravitational force.

These, and other objects of the invention not specifically enumerated above, will become readily apparent from the following specifications and drawings in which.

Figure 1:
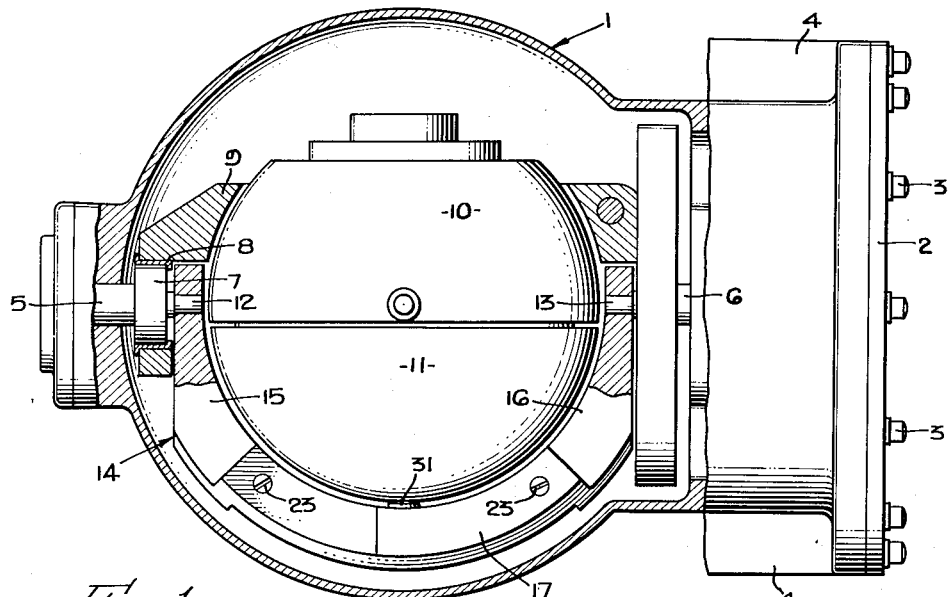
Fig. 1 is an elevational view of the erecting device of this invention with a part of the casing removed to illustrate the position of the erector relative to the erecting dome.
Figure 2:
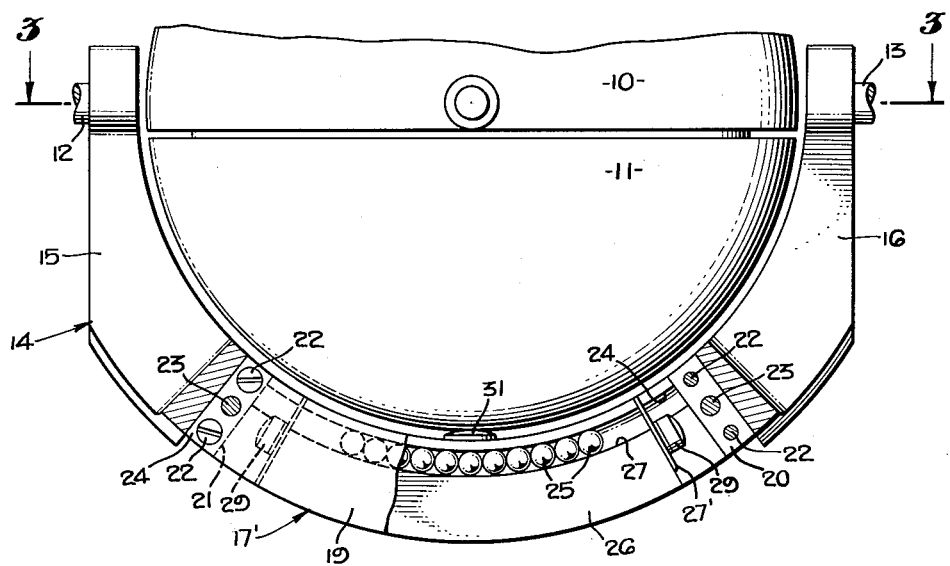
Fig. 2 is an elevational view partly in cross section showing the gravity sensitive carriage which mounts the erecting device for movement about the roll axis.
Figure 3:
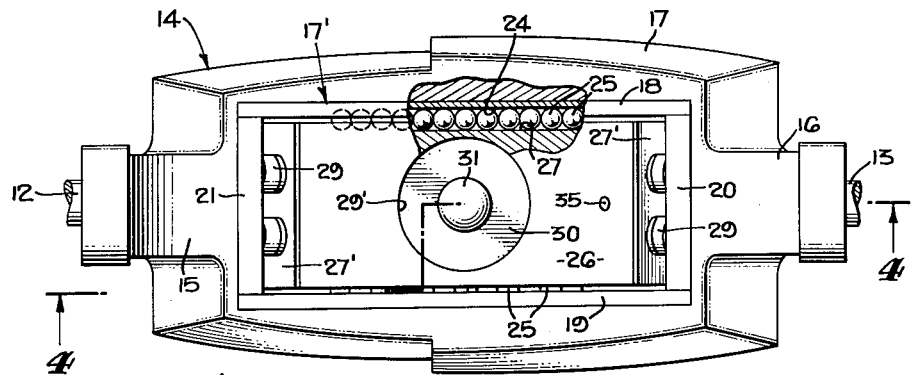
Fig. 3 is a top plan view along line 3—3 of Fig. 2 illustrating the acceleration sensitive mass supported by the carriage.

The embodiment of the invention illustrated in Figs. 1 through 5 comprises a casing 1 having an opening at one end which is closed by a plate 2 secured by screws 3 to the casing. The casing is rigidly supported by flanges 4 within the aircraft so that Fig. 1 is transverse to the direction of flight. Shafts 5 and 6 are rigidly supported by the casing and have bearings 7 (only one of which is shown) positioned within retainers 8. The outer gimbal ring 9 has openings for receiving retainers 8 so that the outer gimbal ring is pivotally supported by shafts 5 and 6 for movement about the pitch axis of the aircraft.

The inner gimbal ring 10 is pivotally mounted on outer gimbal ring 9 by bearing (not shown) so that its pivotal axis is perpendicular to the axis of shafts 5 and 6 and lies along the roll axis of the aircraft. An electrically driven motor (not shown) is mounted within the inner gimbal ring to drive the gyro rotor and a dome 11 is secured to the rotor for rotation therewith. Thus, the gyro rotor is universally mounted and can be used to adjust the usual pitch and roll references contained within the casing 1.

The shafts 5 and 6 have reduced end portions 12 and 13 respectively which serve as bearing supports for the pendulous bail 14 so that the bail is free to move about the pitch axis of the aircraft. The bail has arms 15 and 16 and an enlarged portion 17 which contains a rectangular opening for receiving a frame 17' comprised of sides 18 and 19 and ends 20 and 21. This frame is of the same height and curvature as the portion 17 of the bail so that it does not project beyond the surface of the bail and thus follows the contour of the dome 11.

Prior to being inserted into the rectangular opening, the sides and ends of the frame are secured together by means of screws 22 which pass longitudinally through the ends 20 and 21. After the frame is inserted into the bail, it is secured to portion 17 by means of four screws 23 located at each corner of the frame. These screws pass through portion 17 and through the sides of the frame and are threaded into ends 20 and 21.

The sides 18 and 19 each have an interior groove 24 which is curved to follow the contour of the bail 14 and each of the grooves receives a plurality of ball bearings 25. A carriage 26 is positioned within the opening in frame 17' and is provided with a groove 27 on each side, which grooves cooperate with grooves 24 in sides 18 and 19 in order to guide the ball bearings. A plate 27' is mounted on each end of the carriage by a pair of screws 29 and the ends of these plates serve to retain the ball bearings within the grooves. Thus, the carriage 26 is free to move back and forth relative to the bail in a direction about the roll axis of the aircraft. The carriage is curved along its length to follow the contour of dome 11 and the ends of the carriage have the same inclination as the ends 20 and 21. A pair of openings 28 are positioned in each of the end portions 20 and 21 to receive the heads of screws 29 so that the screw heads will not interfere with the movement of the carriage.

The carriage 26 is a gravity sensitive mass which is free to move relative to the bail about the roll axis of the aircraft. The length of the opening in frame 17' is somewhat greater than the length of carriage 26 and this difference in length determines the amount of relative movement that can take place. In the modification being described, the carriage 26 has a center opening 29' which receives a mass 30 and this mass is freely slideable in the opening. A friction erector 31 is mounted in the upper surface of the mass 30 and the under surface of the mass has a groove 32 which receives one end of leaf spring 33. The other end of the leaf spring is secured to one of the plates 27' and the spring is bent so as to lie along groove 34 in the bottom of carriage 26. A screw 35 positioned in groove 34 passes through spring 33 and is threaded into an opening in the under side of the carriage. The spring 33 serves to press the erector 31 into contact with the surface dome 11 and the force of the spring can be adjusted by turning screw 35. Normally, the mass 30 is subject only to gravitational force and the upward force of spring 33 is set to just overcome this gravitational pull and maintain the contact between the erector and the dome.

The action of the erector 31 in precessing the gyroscope is the same as disclosed in the previously mentioned patent applications in that when the erector is displaced from a position directly in line with the spin axis of the rotor, the gyro will be precessed toward the erector. It is understood that the curvature of the bail and carriage is substantially the same as that of dome 11 so that the erector can move relative to the dome and still maintain contact with the dome.

Figure 4:
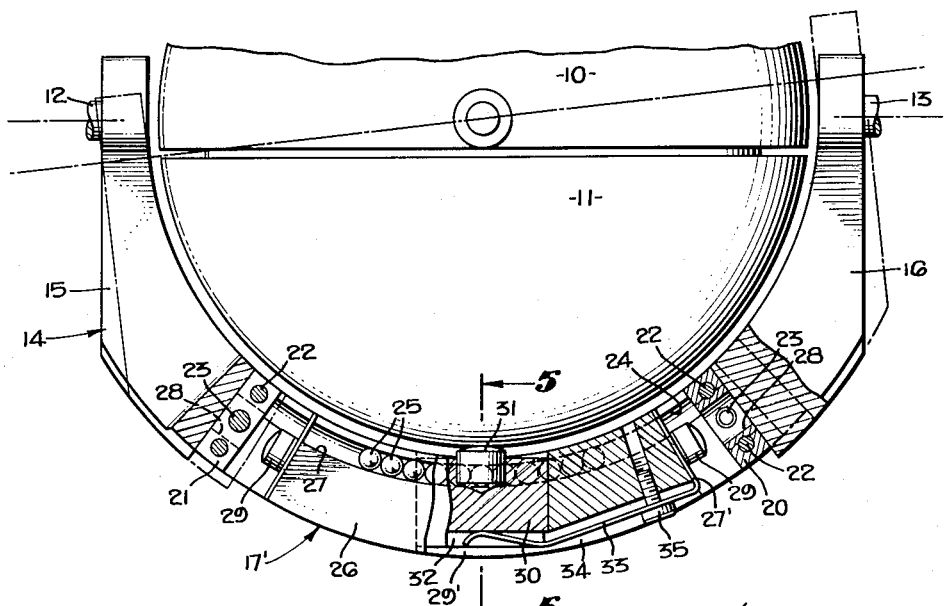
Fig. 4 is a vertical section along line 4—4 of Fig. 3 illustrating the manner in which the erector is mounted so as to be sensitive to turning movement.
Figure 5:
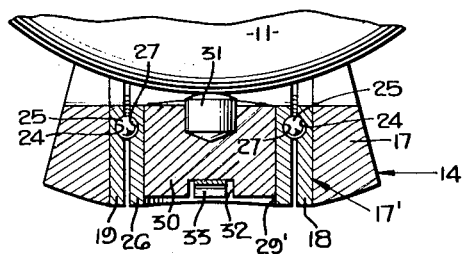
Fig. 5 is a transverse vertical section along line 5—5 of Fig. 4 illustrating the erector mounted in the acceleration sensitive mass.

Since the bail 14 is gravity sensitive about the pitch axis of the aircraft, the erector 31 will erect the gyro to gravity vertical about the pitch axis. Also, since the carriage 26 is free to move about the roll axis in response to the gravitational force, the gyroscope will be also erected to gravity vertical about the roll axis. The amount by which the carriage is free to move relative to the bail about the roll axis is slightly greater than that required to permit gravity erection in roll of those aircraft having maximum deviation of the wings from horizontal in order to fly straight. The position of the carriage relative to the bail when this maximum wing deviation is encountered is illustrated in Fig. 4 where the bail is shown in dashed lines in a position corresponding to straight flight of the out-of-trim aircraft. It is pointed out that it is preferable to have clearance between the carriage and the end 21 even in this maximum condition.

The operation of this modification of the invention will now be described. When the aircraft is in straight flight, the erector 31 will erect the spin axis of the gyroscope to gravity vertical about both the roll and pitch axes of the aircraft. Gravity erection in roll is possible since it is provided that carriage 26 will be gravity sensitive when the aircraft is in its straight flight attitude about the roll axis. Thereafter, any change in roll or pitch attitude of the aircraft will be corrected for by the control system of the gyroscope. When the aircraft is placed in a turn by the operator, the bail 14 will move about the roll axis with the aircraft and the carriage 26 will remain gravity erected since the position of the carriage will be determined by the resultant of gravity and centrifugal forces acting on the carriage. Thus, the carriage will not be in contact with either of ends 20 or 21 during a turn but will move in the same direction as the bail.

Because of this movement of the carriage away from true gravity vertical about the roll axis during a turn the erector would normally tend to precess the spin axis of the gyro away from true vertical about the roll axis if it remained in contact with the dome. However, the acceleration force acting on mass 30 during a turn plus the gravitational force normally acting on mass 30 is sufficient to overcome the force of spring 33, and, thus, the mass 30 and erector 31 will be moved away from dome 11 and the erector will not continue to erect the gyroscope away from true vertical about the roll axis. After the aircraft has been placed back on a straight course following a turn, the spring 33 will move erector 31 back into contact with the dome 11 so that the gyroscope will again be gravity erected about both the roll and pitch axes in the same manner as before the turn. The disengagement of the erector during turning has the advantage that there will be no appreciable displacement of the spin axis about the roll axis during the turn which would later show up as a pitch error after the turn.

Figure 6:
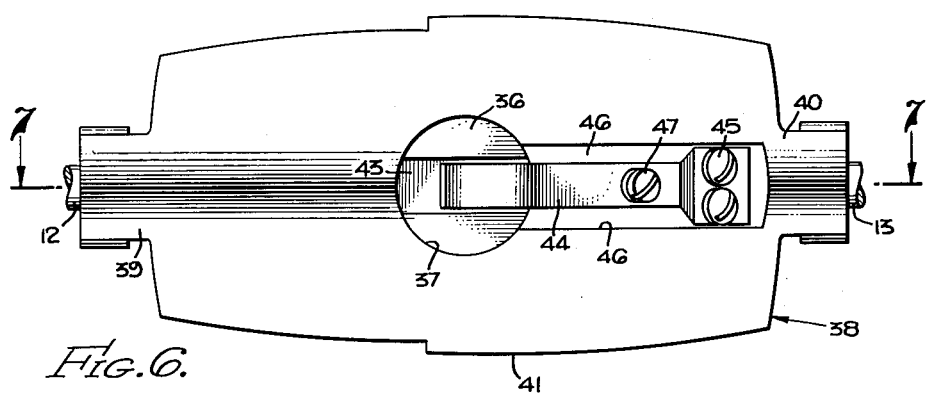
Fig. 6 is a bottom plan view of a modification of the invention wherein the erecting device is not gravity sensitive about the roll axis.
Figure 7:
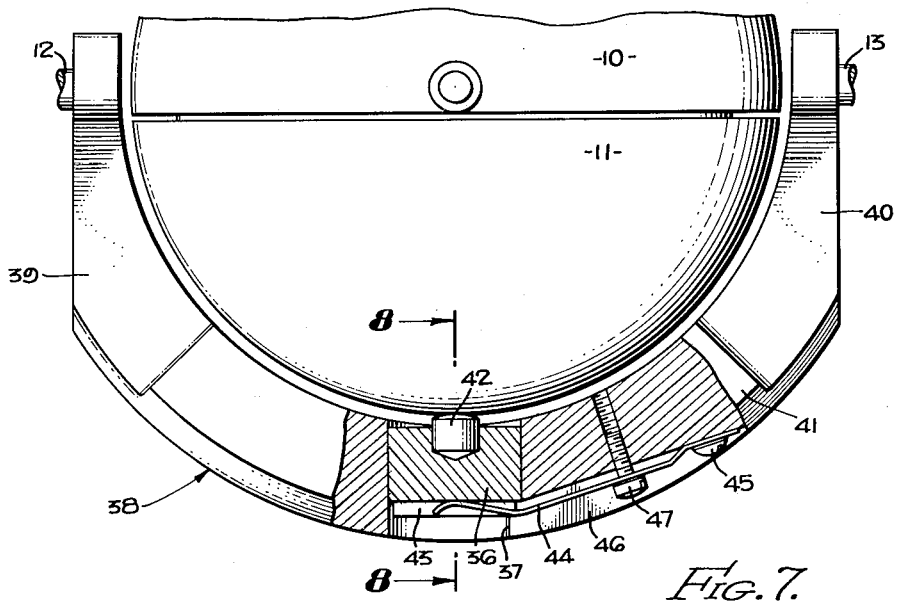
Fig. 7 is an elevational view taken along line 7—7 of Fig. 6 showing the erector mounted in the acceleration responsive mass.
Figure 8:
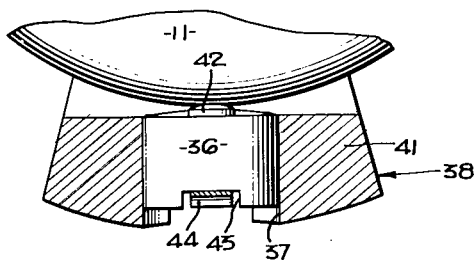
Fig. 8 is a transverse vertical section along line 8—8 of Fig. 7 illustrating the normal position of the erecting device relative to the erecting dome.

In the modification illustrated in Figures 6 through 8, wherein like reference numerals indicate previously described parts, the gravity sensitive mass 36 is slidably mounted in a circular opening 37 in the bail 38. This bail has arms 39 and 40 and an enlarged portion 41 which is solid except for opening 37. The bail is pivotally mounted about shafts 12 and 13 in the same manner as in the previous modification so as to be gravity sensitive about the pitch axis of the aircraft.

The mass 36 mounts the friction erector 42 in its upper surface and has a groove 43 in its lower surface to receive one end of spring 44. The other end of spring 44 is secured to portion 41 of the bail 38 by screws 45 and the spring lies along groove 46 in the under surface of portion 41. The screw 47 is threaded into portion 41 so that the head of the screw is positioned in groove 46 and bears against the surface of spring 44 between its two ends. The spring 44 serves to press the erector 42 into contact with the surface of erecting dome 11 and the force of the spring can be adjusted by turning screw 47. Normally, the mass 36 is subject only to gravitational force and the upward force of spring 44 is set to just overcome this gravitational pull and maintain the contact between the erector and the dome 11.

In operation, after the aircraft has been placed in straight flight by the operator, the friction erector 42 will erect the spin axis of the rotor to its straight flight reference position by gravity erection about the pitch axis and case erection about the roll axis. Thereafter, any deviation of the aircraft from straight flight will be detected by the gyroscope and corrected for by the control system of the gyroscope. One such control system is illustrated in patent application Serial No. 225,997 (now U. S. Patent No. 2,635,469), filed May 12, 1951, by Thomas O. Summers, Jr.

When the aircraft is placed into a turn by the operator, the acceleration force encountered by mass 36 will be in addition to the usually gravitational force and therefore, mass 36 will move against spring 44 so that erector 42 is disengaged from dome 11. However, spring 44 will prevent mass 36 from sliding out of opening 37. Since the erection action of erector 42 is interrupted during turns, the spin axis of the rotor will not follow the erector as it moves with the aircraft about the roll axis but will remain approximately in its straight flight position. After the aircraft is returned to straight flight, the acceleration force on mass 36 will no longer be present and the erector will again engage dome 11 in order to correct for any deviation of the spin axis from its straight flight position. Since the present invention provides for disengagement of the friction erector during turning, there will be no substantial movement of the pin axis of the gyroscope about the roll axis during turns which would later indicate an error in pitch after straight flight is resumed. For instance, in a 90 degree turn practically the total displacement of the spin axis about the roll axis would show up as pitch error. Also, without the disengagement of the erector, the aircraft would have to be held in straight flight for a sufficient time to allow the spin axis to be precessed back to its straight flight reference position after being displaced.

It is understood that the acceleration responsive erecting device of this invention can be made responsive to other movements of the mounting craft than turning movements and that other types of erectors and springs can be utilized. Various other modifications are contemplated and may be resorted to by those skilled in the art, without departing from the spirit and scope of the invention as hereinafter defined by the appended claims.

What is claimed is:

1. In a gyroscope for a movable craft, a spherical erecting dome rotated by the gyro rotor of said gyroscope, a gravity sensitive bail positioned around said dome, a mass slidably supported by said bail so as to be responsive to the force of gravity and to acceleration forces encountered during changes in direction, a friction erecting means carried by said mass and spring means for counteracting the force of gravity on said mass to maintain said erecting means in erecting position with respect to said dome only during straight flight of said craft.

2. In a device for erecting a gyroscope for a movable craft, a rotating erecting dome, a gravity sensitive bail mounted about the pitch axis of said craft and following the contour of said dome, a mass slidably mounted by said bail for a movement under the influence of gravity and acceleration forces, friction erector means carried by said mass in position to move into contact with said dome and spring means for holding said erector means in contact with said dome against the force of gravity to erect said gyroscope, said spring means being overcome when acceleration forces act upon said mass during turning movement of said craft to permit said erector means to move away from said dome and completely eliminate the erecting action of said erector means.

3. In a gyroscope for a movable craft, a rotating erecting dome, a gravity sensitive bail mounted about the pitch axis of said craft and following the contour of said dome, a gravity sensitive carriage supported by said bail for movement relative to said bail about the roll axis of said craft, a mass slidably mounted by said carriage for movement under the influence of gravitational force and acceleration force resulting from turning movement of said craft, friction erector means carried by said mass in position to move into contact with said dome and spring means for engaging said erecting means with said dome during straight flight and permitting disengagement of said erecting means from said dome during turning of said craft.

4. An erecting device for a gyroscope carried by a movable craft, comprising a rotating erecting dome, a gravity sensitive bail pivotally mounted about one axis of said craft and positioned around said dome, a mass slidably mounted in an opening in said bail for movement transverse to said bail under the influence of gravitational force and acceleration force encountered during changes in direction of said craft, a friction erecting means carried by said mass, and spring means acting against said mass for holding said erecting means in contact with said dome when only gravitational force acts on said mass, said spring means being overpowered by the combination of gravitational and acceleration forces resulting from a change in direction to permit said erector to move away from said dome and thereby completely eliminate the erecting force on said dome.

References Cited in the file of this patent

UNITED STATES PATENTS

| | | |
|---|---|---|
| 1,825,345 | Fieux | Sept. 29, 1931 |
| 2,339,606 | Sias | Jan. 18, 1944 |
| 2,380,538 | Meredith | July 31, 1945 |
| 2,428,925 | Borell | Oct. 14, 1947 |
| 2,441,157 | Kissel | May 11, 1948 |